United States Patent [19]

Richter et al.

[11] Patent Number: 5,015,071
[45] Date of Patent: May 14, 1991

[54] LIGHT DISTRIBUTOR FOR AN X-RAY DIAGNOSTICS INSTALLATION

[75] Inventors: Helmut Richter, Baiersdorf; Adelbert Kupfer, Poxdorf, both of Fed. Rep. of Germany

[73] Assignee: Siemens Aktiengesellschaft, Berlin and Munich, Fed. Rep. of Germany

[21] Appl. No.: 438,871

[22] Filed: Nov. 20, 1989

[30] Foreign Application Priority Data

Dec. 23, 1988 [EP] European Pat. Off. ........ 88121550.3

[51] Int. Cl.$^5$ .......................... G02B 27/14; G02B 7/18
[52] U.S. Cl. .................................... 350/171; 350/172; 350/602; 350/623; 350/626; 378/62; 378/99
[58] Field of Search ............... 350/171, 172, 612, 618, 350/623, 624, 626, 631, 632, 633, 634, 637, 169, 601, 602; 378/41, 42, 62, 99; 358/111

[56] References Cited

U.S. PATENT DOCUMENTS

| | | | |
|---|---|---|---|
| 2,285,515 | 6/1942 | Hurley | 350/171 |
| 2,343,846 | 3/1944 | Robinson | 378/42 |
| 3,622,786 | 11/1971 | Walker et al. | 250/77 |
| 3,684,354 | 8/1972 | Koch | 350/289 |
| 4,058,833 | 11/1977 | Meyer | 358/111 |
| 4,135,785 | 1/1979 | Bernolak et al. | 350/172 |
| 4,237,492 | 12/1980 | Roth et al. | 358/108 |
| 4,383,328 | 5/1983 | Kurihara et al. | 378/42 |
| 4,413,352 | 11/1983 | Nishio | 378/41 |
| 4,908,843 | 3/1990 | Gall et al. | 350/171 |

FOREIGN PATENT DOCUMENTS

| | | |
|---|---|---|
| 0051430 | 10/1981 | European Pat. Off. . |
| 0052995 | 11/1981 | European Pat. Off. . |
| 8710425 | 7/1987 | Fed. Rep. of Germany . |

Primary Examiner—Bruce Y. Arnold
Assistant Examiner—R. D. Shafer
Attorney, Agent, or Firm—Hill, Van Santen, Steadman & Simpson

[57] ABSTRACT

A light distributor for an x-ray diagnostics installation has mirror-symmetrically disposed sets of light exit ports at a housing, which are adapted for connection to various different image recording components. Inside the housing, a mirror system is provided which can be arranged in a first position or a second position. When the system is arranged in the first position, light is directed from an input port of the light distributor to a first of the sets of light exit ports in the housing. When the mirror system is arranged in the second position, light from the input port is directed to a second of the sets of light exit ports. The mirror system can be changed between the first and second positions by a simple manual operation, using the same mirrors and the same mirror mounts, which are interchangeably accepted in a single set of mounting locations in the housing.

5 Claims, 3 Drawing Sheets

LIGHT DISTRIBUTOR FOR AN X-RAY DIAGNOSTICS INSTALLATION

BACKGROUND OF THE INVENTION

1. Field of the Invention

The present invention is directed to a light distributor for use in an x-ray diagnostics installation for directing light from the output screen of an x-ray image intensifier to various image recording components.

2. Description of the Prior Art

Several ways are known in the art for recording the output image from an x-ray image intensifier in an x-ray diagnostics installation. Each type of recording requires a different component, such as a photographic camera, a movie camera, or a video camera. It is also sometimes desireable to record images simultaneously using more than one image recording component. This requires that the light forming the output image of the x-ray image intensifier be distributed to the various image recording components. A light distributor suitable for this purpose is described, for example, in U.S. Pat. No. 4,383,328. This known light distributor directs the light in a beam path from the output image of an x-ray image intensifier through a mirror system to a plurality of image recording components attached to the exterior of the housing of the light distributor. For this purpose, the mirrors in the mirror system may be semi-reflecting, i.e., have a reflection deviating from 100%, and can be selectively moved into the beam path, dependent on the configuration of the image recording components.

It is usually desireable in such light distributors to connect the image recording components mirror-symmetrically to light exit ports at the housing of the light distributor. This means the incoming light (i.e., the output image of the x-ray image intensifier) must be directed within the light distributor to the light output ports. It is therefore known in the art to use different light distributors which are, one at a time, inserted into or removed from the x-ray diagnostics installation, depending upon the types of image recording devices which are to be used to conduct a particular examination. Thus a light distributor with a first housing configuration having a pair of light output ports for the imaging recording components, and a mirror system for directing the output image from the x-ray intensifier to these light output ports is available, as needed. A second housing is also available having light output ports for the image recording components arranged mirror-symmetrically relative to the light exit ports of the first housing, and having a mirror system for directing the output image from the x-ray image intensifier to said light exit ports.

The manufacture of different housings and different mirror systems is very costly.

SUMMARY OF THE INVENTION

It is an object of the present invention to provide a light distributor which, within a single housing, having output ports which are mirror-symmetrically arranged, and a mirror system which can be selectively positioned in one of two possible positions to direct the incoming light from the x-ray image intensifier to a desired pair of light exit ports.

The above object is achieved in a light distributor constructed in accordance with the principles of the present invention having a housing with a first pair of light exit ports, and a second pair of light exit ports arranged mirror-symmetrically relative to the first pair of light exit ports. A mirror system is contained within the housing including a plurality of mirrors for directing light in a beam path from the output screen of an x-ray image intensifier to one pair of light exit ports at a time. The mirrors of the mirror system can be mounted in one of two possible positions, depending upon the pair of light exit ports which are to be used. In a first position, the mirrors of the mirror system direct the incoming light to the first pair of light exit ports, and in a second position the mirrors direct the incoming light to the second pair of light exit ports.

The mirror system can be simply reconfigured between the first and second positions by a simple manual operation, depending upon which light exit ports are to be used, so that only one housing and one mirror system are required to accommodate both pairs of light exit ports. The manufacturing costs of an extra light distributor, as have been previously required, are thus reduced.

The mirrors in the mirror system are preferably seated on mounts which are detachably secured to a base plate of the housing of the light distributor. The mirror system comprises a total of two mirrors. The first mirror of said mirrors is centrally disposed within the housing to receive the light from the output screen of the x-ray image intensifier and direct the light to one of said output ports, respectively onto the second mirror of the mirror system. The second mirror is mounted at the first position to direct the light to both ports of the first pair of light exit ports. After displacement of said mirrors from the first position into said second position, the first mirror directs light to one of said second output ports, respectively to said second mirror which directs light to both ports of said second pair of output ports. The changeover operation is thus simplified and shortened, and the manufacturing outlay is reduced because the manufacture of different mounts for the mirrors is not needed.

DESCRIPTION OF THE PREFERRED EMBODIMENTS

Figure 1:
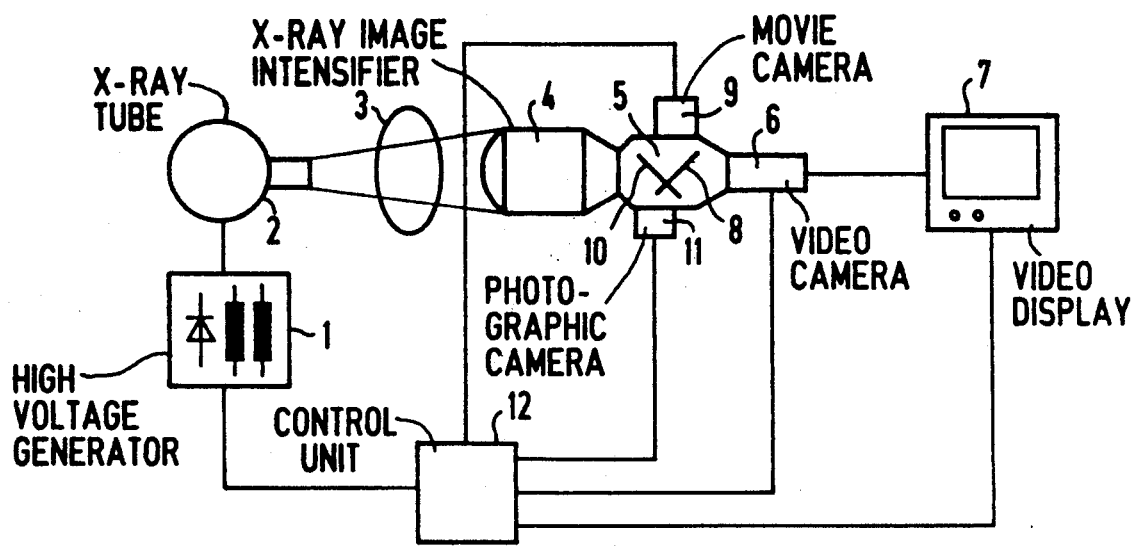
FIG. 1 is a block diagram of an x-ray diagnostics installation including a light distributor of the type known in the prior art.

An x-ray diagnostics installation, of known construction, is shown in FIG. 1, of the type in which a light distributor constructed in accordance with the principles of the present invention can be used. The x-ray installation includes a high voltage generator 1 which supplies an x-ray tube 2. The x-ray tube 2 emits an x-ray beam which penetrates a patient 3. Radiation attenuated by the patient 3 is incident on the input luminescent screen of an x-ray image intensifier 4. A light distributor 5 has a light input port coupled to the output screen of the x-ray image intensifier 4, and directs the light from the output screen of the x-ray image intensifier to one or more image recording components. These image recording components may include a video camera 6, which generates a video signal for display on a monitor 7, and other image recording components 9 and 11, such as a photographic camera and a movie camera. The incoming light to the light distributor is directed by moveable mirrors 8 and 10 to the desired image recording components. The mirror 8, for example, may be moved into the beam path to direct the light to the image recording component 9, and the mirror 10 may be moved into the light beam path to direct light to the image recording components 11.

A control unit 12 controls and synchronizes the operation of the high voltage generator 1, the video camera 6 and the video display 7, the positioning of the mirrors 8 and 10, and the operation of the cameras 9 and 11.

Figure 2:
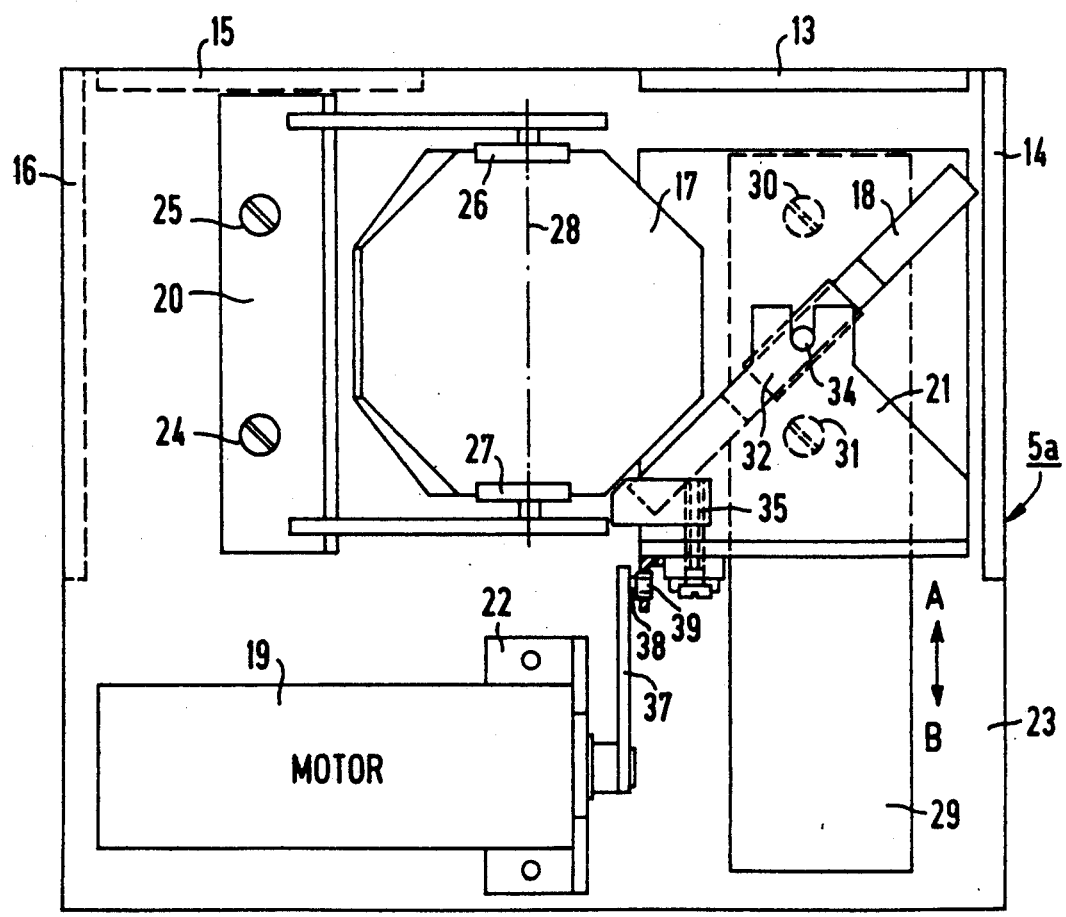
FIG. 2 is a view of the components of a light distributor as seen from the light input port along line II—II in a first position constructed in accordance with the principles of the present invention.
Figure 5:
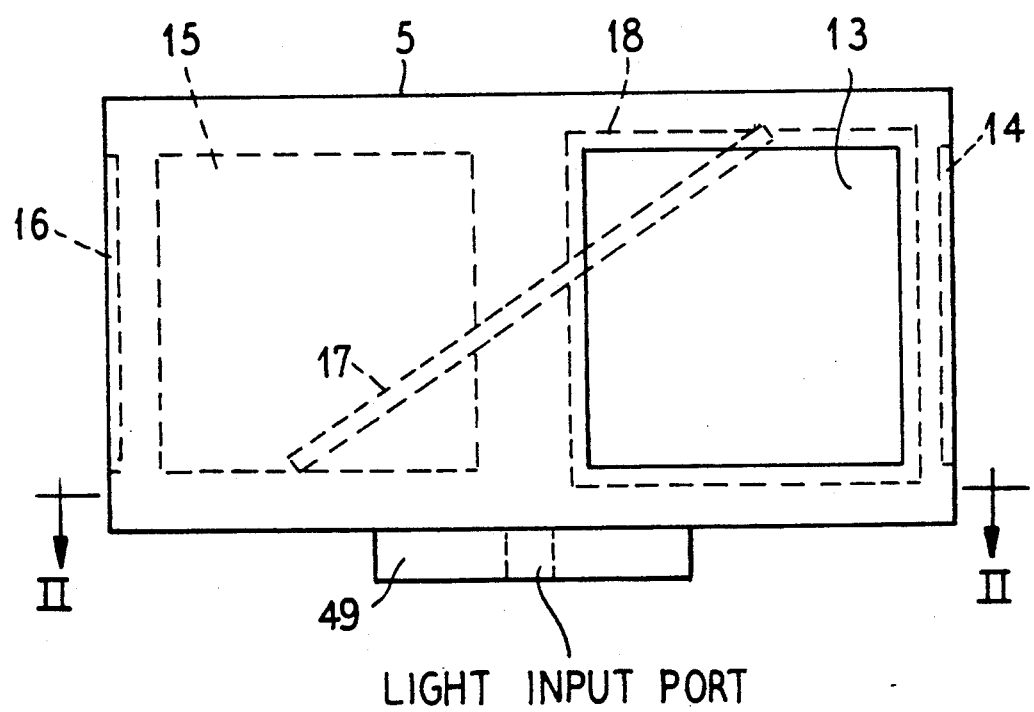
FIG. 5 is a plan view of the light distributor of FIG. 2.

A light distributor 5a constructed in accordance with the principles of the present invention is shown in plan view in FIG. 2 as "seen" via the light input port 49 as shown in FIG. 5, thus as "seen" by the output screen of the x-ray image intensifier 4. The light distributor 5a has a housing in which a first pair of light exit ports 13 and 14 are disposed, shown in solid lines. The housing also includes a second pair of light exit ports 15 an 16, shown in dashed lines, which are arranged mirror-symmetrically relative to the light exit ports 13 and 14.

The housing contains a mirror system including a first mirror 17, and a second mirror 18 which is adjustable into the beam path of the output image of the x-ray image intensifier. As noted above, the components in FIG. 2 are as "seen" by the light input port through which light from the output screen of the x-ray image intensifier enters the light distributor 5a.

The mirror 17 is attached to a base plate 23 of the light distributor 5a by a mount 20. The mirror 18 is attached to the base plate 23 by a mount 21. A motor 19 is provided for adjusting the mirror 18 in the light beam path. The motor 19 is mounted to the base plate 23 by a mount 22.

The mount 20 for the mirror 17 is secured to the base plate 23 with screws 24 and 25. The mirror 17 is supported by lateral mount elements 26 and 27, which form a two-point bearing so that the mirror 17 is pivotable around an axis 28 extending parallel to the base plate 23. The axis 28 is aligned so that, in order to direct the output image from the x-ray image intensifier to the light exit port 14, the mirror 17 need only be pivotably adjusted around the axis 28. The adjustment of the mirror 17 is accomplished in any suitable manner, such as by an adjustment element (not shown) by which the inclination of the mirror 17, i.e., the angle of the mirror 17 relative to the base plate 23 is set. Typically this angle will be approximately 45°.

The mirror 18 may be semi-reflective so that light incident thereon is divided so as to reach both the light exit ports 13 and 14 when the mirror 18 is in the position shown in FIG. 2. The mount 21 for the mirror 18 is supported on a rail 29, described in detail below, which is secured to the base plate 23 by screws 30 and 31 (shown in dashed lines) the mirror 18, via the mount 21, can be moved on the rail 29 in the directions A and B, indicated by the double arrow. The mirror 18 is supported on the mount 21 by lateral mount elements 32 and 33 (only lateral mount element 32 being visible in FIG. 2; both lateral mount elements can be seen in FIG. 3), so that a two-point bearing is formed so that the mirror 18 is pivotable around an axis 34. The axis 34 is aligned so that the adjustment of the mirror 18 required for directing the output image of the x-ray image intensifier to the light exit ports 13 and 14 is accomplished only via adjustment element 35, also described in greater detail below, which pivots the mirror 18 around the axis 34. In the position shown in FIG. 2, the mirror 18 directs a portion of the light beam from the output image of the x-ray image intensifier, which is directed to the mirror 18 by the mirror 17, to dependent on the reflection of the mirror 18, the light exit port 13, which is adapted for attachment to one image recording component, and a remainder of the light, dependent on the transmission of the mirror 18, to the light exit port 14, adapted to receive a second image recording component.

Figure 3:
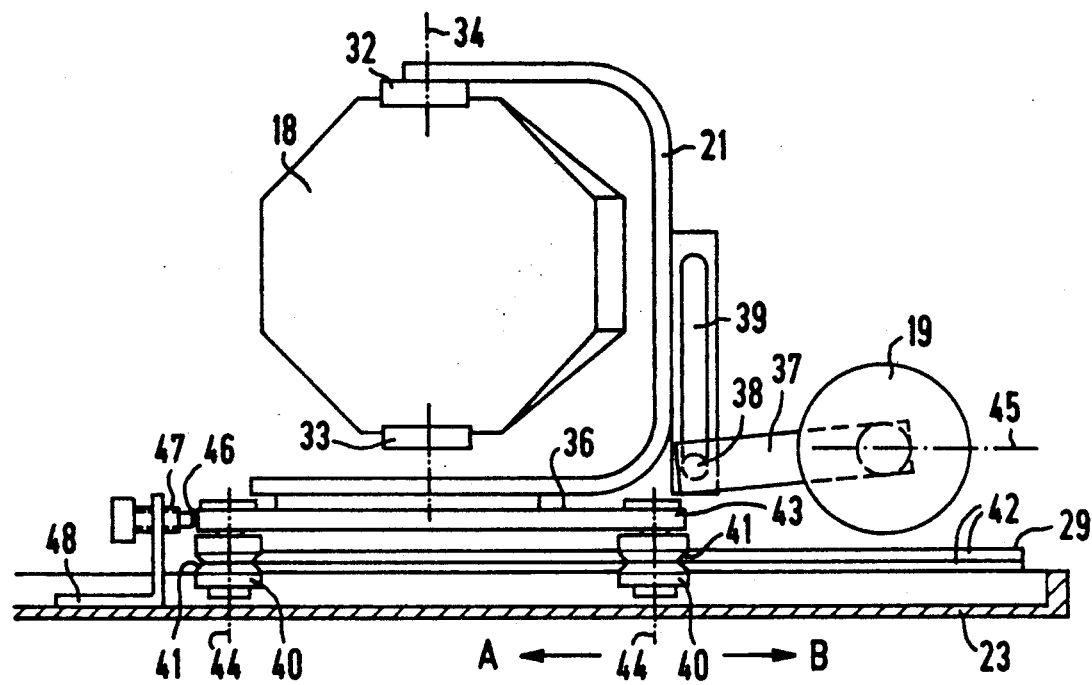
FIG. 3 is a side view, with the housing removed, of one of the mirrors of the mirror system in the light distributor constructed in accordance with the principles of the present invention.

The mirror 18 is shown in FIG. 3 with its mount 21. The mount 21 is attached to a carriage 36, which is moveable along the rail 29 by the operation of the motor 19 The motor 19 has a lever 37 attached at one end to the drive shaft of the motor 19, and having a pin 38 at its opposite end. The pin 38 is received in an oblong guide 39 of the mount 21, which is aligned approximately perpendicularly relative to the base plate 23. The carriage 36 is seated on the guide rail 29 by cylindrical roller bearings 40. Each of the roller bearings 40 has a guide channel 41 therein, which engages a lateral surface 42 of the rail 29. Four such roller bearings 40 are provided, two of which are disposed at a side 43 of the carriage 36 via non-adjustable axles 44, and the other two roller bearing 40 being disposed at the side of the carriage 36 opposite to the side 43 via eccentrically adjustable axles (which cannot be seen in FIG. 3). The contact of the roller bearings 40 with the lateral surfaces 42 of the rail 29 is set by the eccentrically adjustable axles.

The mirror 18 is shown in final position in FIG. 2. The mirror 18 is moved to this final position by operation of the motor 19 which, via the linkage formed by the lever 37, the pin 38 and the guide hole 39, moves the mirror 18 and its mounting assembly in the direction of arrow A. When the mirror 18 is in the final position shown in FIG. 2, the lever 37 will be substantially parallel to the base plate 23 and a horizontal axis 45. At the final position shown in FIG. 3, an end face 46 of the carriage 36 is disposed against a spring-loaded plunger assembly 47, so that any play in the linkage consisting of the lever 37, the pin 38 and the hole guide 39, and the carriage 36 is absorbed by the spring in the plunger assembly 47. The plunger assembly 47 is attached to the base plate 23 by a mount 48.

The mirror 18 can be moved out of the beam path by further operation of the motor 19. When the mirror 18 is out of the beam path, the lever 37 will be in a position substantially perpendicular relative to the base plate 23 and the axis 45, so that the pin 38 moves upwardly within the hole guide 39, thereby moving the carriage 36 in the direction of the arrow B. An even larger adjustment path can be obtained, if desired, if the lever 37 is rotated through 180° around the drive shaft of the motor 19, so as to come to rest again parallel with the axis 45, but on the opposite side of the motor 19 from the position shown in FIG. 3.

Figure 4:
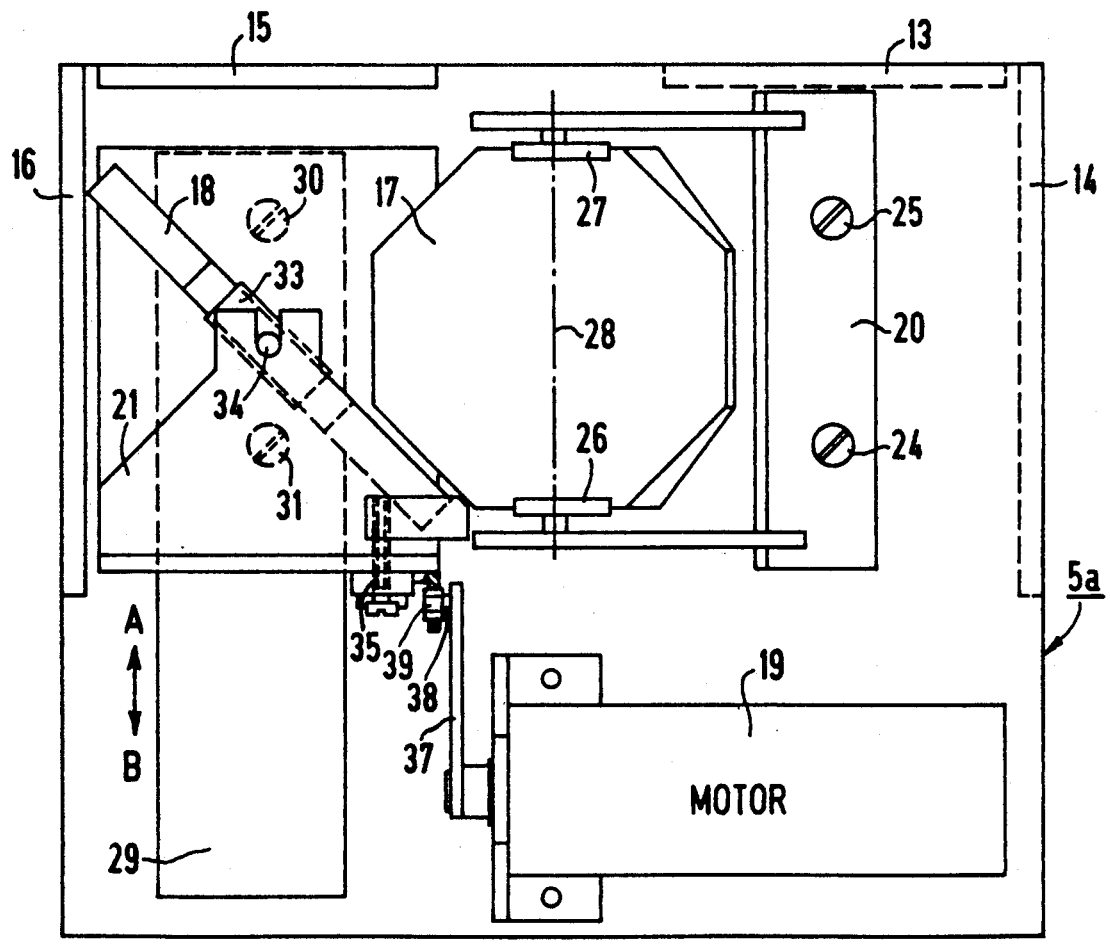
FIG. 4 is a view of the components of a light distributor constructed in accordance with the principles of the present invention as seen from the light input port and arranged in the second position, mirror-symmetrical to the position shown in FIG. 2.

The mirror system is shown in FIG. 4 repositioned to direct light to the light exit ports 15 and 16, and accordingly the light exit ports 13 and 14 are shown in FIG. 4 in dashed lines. The same components as described in connection with FIGS. 2, 3 and 5 are used in the configuration of FIG. 4, but are arranged differently within the housing of the light distributor 5a. (Even though FIG. 5 shows a section line II—II, it will be understood that FIG. 4 is also a view as "seen" by the light input port along this section line.) For this purpose, the screws 24, 25, 30 and 31 were removed. The mount 20 for the mirror 17 was then turned around so that, in the position shown in FIG. 4, it is attached to the base plate 23 at the location at which the rail 29 occupied in the position of FIG. 2, and is re-secured to the base plate 23 by the screws 24 and 25 (or the same screws 30 and 31). The rail 29 has been moved, in the arrangement of FIG. 4, to the location on the base plate 23 occupied by the mount 20 in the arrangement of FIG. 2, and is secured to the base plate 23 by the screws 30 and 31 (or the same screws 24 and 25). The same threaded bores in the base plate 23 for the screws 24, 25, 30 and 31 are used in both of the configurations shown in FIGS. 2 and 4. The plunger assembly 47 and its mount 48 are re-positioned within the housing of the light distributor 5a to a corresponding location on the base plate 23 for arresting movement of the carriage 36. The mirror 18 is adjusted through 90° around the axis 34 in a clockwise direction, so that the mirror 18, if moved into the beam path of light reflected by the mirror 17 from the output screen of the x-ray image intensifier, divides the light so as to be directed to the light exit ports 15 and 16. If the adjustment of the mirror 18 through 90° is not undertaken, i.e., if the mirror 18 is maintained in the same position relative to the mount 20 as it occupied in the arrangement of FIG. 2, the light from the mirror 17 can be directed to a further light exit port (not shown) disposed in the housing of the light distributor 5a opposite to the light exit port 15.

In the reconfiguration leading to the arrangement shown in FIG. 4, the mount 22 for the motor 19 is turned through 180° on the base plate 23, and is re-attached thereto. The lever 37 attached to the drive shaft of the motor 19 is rotated through 180° around the drive shaft, so as to occupy the position shown in FIG. 4. When the motor 19 is operated and the linkage is moved in the manner described in connection with FIGS. 2 and 3 to move the mirror 18 in the direction of arrow A, the mirror 18 moves in the configuration of FIG. 4 in the B direction, and vice versa. If the motor 19 in the arrangement in FIG. 4 is operated inverse to the operation described in FIG. 2 and 3 the direction of movement of mirror 18 in the arrangement in FIG. 4 is the same as in the arrangement shown in FIGS. 2 and 3.

The structure disclosed herein enables the connection of image recording components to two mirror-symmetrically arranged light exit ports at the housing of the light distributor, and enables deflection of the output image of the x-ray image intensifier to these image recording components via a mirror system which can be easily reconfigured in a relatively short time. As noted above, because only one mirror system and one set of mirror mounts are required for the light distributor disclosed herein, only one adjustment mechanism must be provided and the cost for the light distributor is considerably decreased. Instead of securing the mounts 20 and 21 to the base plate 23 with screws, any suitable detachable or releasable connection can be undertaken, such as, for example, a latch or snap-in connection.

The light distributor disclosed herein has been described in the context of a two-channel light distributor. It is also possible, however, to use the same inventive concept disclosed herein to construct a multi-channel (i.e., more than two) light distributor, as long as the respective groups of light exit ports which are to be used at a time are arranged mirror-symmetrically relative to each other.

Although modifications and changes may be suggested by those skilled in the art, it is the intention of the inventors to embody within the patent warranted hereon all changes and modifications as reasonably and properly come within the scope of their contribution to the art.

We claim as out invention:

1. A light distributor for an x-ray diagnostics installation comprising:
   a housing having a light input port and first and second sets of light output ports, the sets of light output ports being disposed mirror-symmetrically relative to each other; and
   a mirror system in said housing consisting of a first and a second mirror and one set of mounting means for detachably locating said first and second mirrors in a respective first position in said housing to direct light from said light input port to said first set of light output ports and for detachably locating said first and second mirrors in a respective second position which is mirror-symmetrical to said first position in said housing to direct light from said light input port to said second set of light output ports.

2. A light distributor as claimed in claim 1, wherein said mounting means is a means for detachably locating said first and second mirrors in a position in said housing to direct light from said light input port to said first set of light output ports and for reversing the position of said first and second mirrors in said housing to direct light from said light input port to said second set of light output ports.

3. A light distributor as claimed in claim 2, wherein said means for mounting includes a lateral two point bearing means for adjustably supporting said first and second mirrors around an axis.

4. A light distributor as claimed in claim 3, wherein said housing has a base plate, and wherein said means for mounting further comprises means for moving said mirrors parallel to said base plate in both said first and second positions.

5. A light distributor for an x-ray diagnostics installation comprising:
   a housing having a light input port, first and second sets of light output ports, and a base plate, said sets of said light output ports being disposed mirror-symmetrically relative to each other;
   first and second mounting locations in said base plate;
   first and second mirrors;
   a first mirror mount for said first mirror; and
   a second mirror mount for said second mirror,
   said first and second mirror mounts adapted to be detachably interchangeably securable, one at a time, to said first and second mounting locations so that when said first mirror mount is in said first mounting location and said second mirror mount is in said second mounting location light from said light input port is directed to said first set of light output ports, and when said first mirror mount is in said second mounting location and said second mirror mount is in said first mounting location, light from said light input port is directed to said second set of light output ports.

* * * * *